US006439660B1

(12) United States Patent
Guenther

(10) Patent No.: US 6,439,660 B1
(45) Date of Patent: Aug. 27, 2002

(54) KINETIC CHILD RESTRAINT DEVICE

(76) Inventor: John Guenther, 1635 N. Mohawk St., Chicago, IL (US) 60614

( * ) Notice: Subject to any disclaimer, the term of this patent is extended or adjusted under 35 U.S.C. 154(b) by 42 days.

(21) Appl. No.: 09/713,472

(22) Filed: Nov. 15, 2000

(51) Int. Cl.$^7$ ................................................ B60N 2/28
(52) U.S. Cl. .............................. 297/216.11; 297/250.1; 297/256.13; 297/216.16
(58) Field of Search ........................ 297/216.11, 250.1, 297/256.1, 256.13, 256.16, 216.16

(56) References Cited

U.S. PATENT DOCUMENTS

| 3,112,955 A | 12/1963 | Stolz |
| 4,733,909 A | 3/1988 | Single, II et al. |
| 5,236,221 A | 8/1993 | Minami |
| 5,280,995 A | 1/1994 | Elton |
| 5,303,979 A | 4/1994 | Koyanagi et al. |
| 5,474,353 A | 12/1995 | Koester et al. |
| 5,494,331 A | 2/1996 | Onishi et al. |
| 5,551,751 A | 9/1996 | Sedlack et al. |
| 5,722,719 A | * 3/1998 | Glomstad .............. 297/216.11 |
| 5,884,967 A | * 3/1999 | Gasper .................. 297/216.11 |
| 5,951,106 A | 9/1999 | Hirama et al. |
| 6,007,338 A | 12/1999 | DiNunzio et al. |
| 6,021,989 A | 2/2000 | Morita et al. |
| 6,027,170 A | 2/2000 | Benz et al. |

FOREIGN PATENT DOCUMENTS

FR 2596338 * 10/1987 ............ 297/216.11

* cited by examiner

Primary Examiner—Peter R. Brown
(74) Attorney, Agent, or Firm—Lee, Mann, Smith, McWilliams, Sweeney and Ohlson

(57) ABSTRACT

The invention is directed to a kinetic child restraint device which is fastened to or integrated into the seat of a vehicle to provide for 360 degree spherical impact protection to significantly reducing the risk of injury to a child in the event of a collision. The restraint device includes a capsule, a pivotally attached bracket and a pivotally attached base. The restraint device is designed so that it will automatically pivot a child forward, rearward and sideways to position the head, neck and back of the child perpendicular to the impact force. The restraint device is also designed to rotate during a collision to dissipate impact forces to reduce the risk of injury to the child.

9 Claims, 2 Drawing Sheets

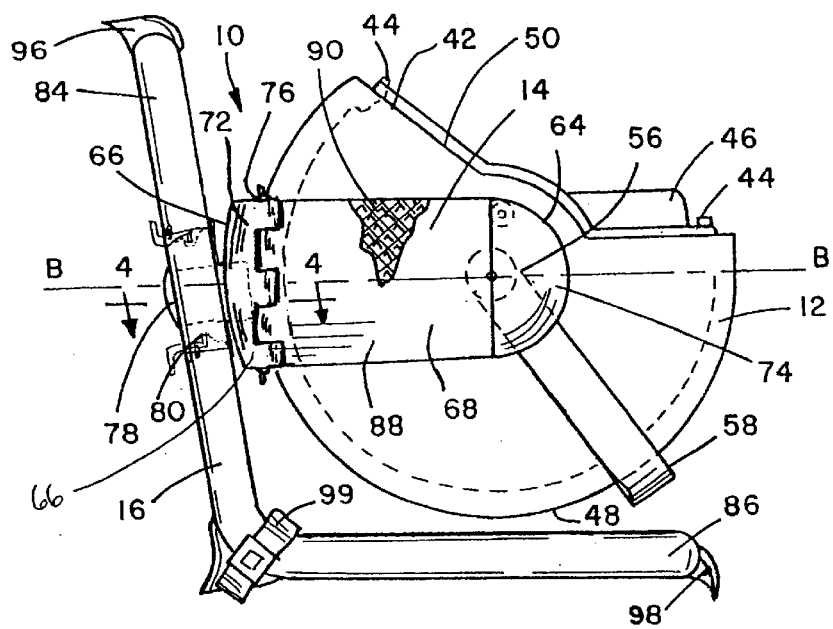

KINETIC CHILD RESTRAINT DEVICE

BACKGROUND OF THE INVENTION

This invention may be described as an improved child restraint device which is fastened to or integrated into the seat of a motor vehicle and provides for 360 degree spherical impact protection, significantly reducing the risk of injury to a child in the event of a collision.

Child restraint devices are used to secure children in motor vehicles such as automobiles, trucks and buses to protect them from injury in the event of an accident. Every 14 seconds someone in America is injured in a traffic crash, and every 12 minutes someone is killed. Each year, traffic crashes in the United States claim about 41,000 lives and cost Americans $150 billion in economic costs. In 1998, an average of 7 children were killed and 866 children were injured every day in motor vehicle crashes.

DESCRIPTION OF RELATED ART

Child seats used in motor vehicles to protect infants (up to age 1) are recommended to be placed upon a vehicle seat in a rearward facing direction and secured in place with the existing vehicle seat belt. Seats for toddlers (1 year or older) are recommended to be placed upon a vehicle seat in a forward facing direction and secured with the existing vehicle seatbelt. Research has found that child safety seats, when used properly, reduce the risk of injury by 71% for infants, less than age 1, and by 54% for toddlers, between 1 and 4 years of age. These child restraint seats are designed to protect an infant from a frontal collision by placing the infant in a rear facing position within the vehicle. Prior art child restraint seats are static by design and are installed so that the back of the seat faces forward in the vehicle, positioning the child in a rear facing direction. This design is based off of crash data which shows that 60% of all motor vehicle collisions are frontal. Since there is a higher probability of a frontal collision, child safety seats are designed to orient the child in a position that causes the least amount of neck and spinal injuries during frontal impacts. The shortcomings of this design is that 40% of all impacts occur from areas other than the front. This crash test data sheds light as to why the present child safety seats still leave a 40% chance of injury for infants less than 1 year of age. Impacts can occur from 360 degrees around a vehicle, broken down into 60% frontal, 20% side, and 20% rear. The infant restraint must then rely on harnesses to restrain the infant, exposing the child's body to powerful impact forces, which cause injuries that are commonly associated with seat belts, such as forward whip lash, and spinal injuries. This situation is only exacerbated for toddlers who typically sit in child safety seats designed to position the child in a forward facing, upright position. These safety seats rely on the restraint harness to protect toddlers from injury. This explains why the use of safety seats for toddlers only reduces the risk of injury by 54%. Crash trauma data also indicates that harnesses can cause head injuries and internal organ damage during impact. The prior art devices do not provide for a infant restraint that adequately protects a child from impact forces caused by a side, rear or other types of collisions. Furthermore, the prior art devices rely upon following the manufacturer's directions for the proper positioning of the seat dependent upon the child's age. Prior art devices, to be effective must be positioned so that the device is placed squarely between the infant and the source of the impact. Since the prior art devices are positioned squarely between the infant and the impact force for frontal collisions only, they are ineffective in preventing injury in other collisions.

SUMMARY OF THE INVENTION

This invention may be described as a kinetic child restraint device that is designed to automatically position a child so that during a collision or sudden change in direction, forces of impact are distributed over a large portion of their body, while at the same time cradling their fragile neck and back. It does so by squarely positioning the capsule between the child and the impact force. The device is also designed to disperse the impact energy by transforming it into rotational energy. The need for the ability to shift the seating position of the child restraint device are threefold. First, the infants undeveloped physical structure requires a generally horizontal seating position, placing the back and neck of the infant in a horizontal orientation. Second, the forces encountered by passengers in a vehicle during a collision can come from any direction (360 degrees), but is generally in a horizontal plane. Lastly, the ideal position of a child during an impact is to orient the neck and back of the child perpendicular to the vector force of the impact. Since the impact force can come from any direction during a collision, the seating position of the restraint device needs to be automatically repositioned during impact to place the neck and back of the infant perpendicular to the impact force.

The kinetic child restraint device of the present invention achieves the automatic alignment of the child in this optimized position, through a system of three articulated elements, a base, an arm and a capsule. The base has a vertical component and a horizontal component and is adapted to be secured to a vehicle seat by using existing lap belts and tether attachments. The arm or arms are pivotally connected to the base element and can rotate 360 degrees. The capsule, which supports the infant, is pivotally connected to the end of the arm or arms allowing the capsule to pivot around two axes of rotation. With the child positioned in the capsule semi-reclined, facing rearward, the balance is eccentric, causing the seat to seek equilibrium, at rest or in motion. The kinetic child restraint device will automatically position the infant in the optimum posture in a zone of reference being 360 degrees spherical. Any impact vector will cause the capsule to react through inertia, by rotating, to orient the back of the child to and at a perpendicular reference. The infant's body mass is restrained in the seat by the effects of centrifugal force.

BRIEF DESCRIPTION OF THE DRAWING

FIG. 3 is a side view of the kinetic child restraint device.

FIG. 4 is a cross-sectional view of a portion of the kinetic child restraint device according to FIG. 3 showing the pivot connection to the vertical component of the base.

FIG. 5 is a perspective view of an alternative embodiment of the kinetic child restraint device with the pivot point repositioned to the horizontal component of the base adjacent the seat bottom.

FIG. 6 is a cross-sectional view of a portion of the alternative embodiment of the kinetic child restraint device according to FIG. 5 showing the pivot connection of the base and the arm.

FIG. 7 is a perspective view of an alternative embodiment of the kinetic child restraint device with a single offset pivot point located on the horizontal component of the base member

DETAILED DESCRIPTION OF THE INVENTION

Figure 1:
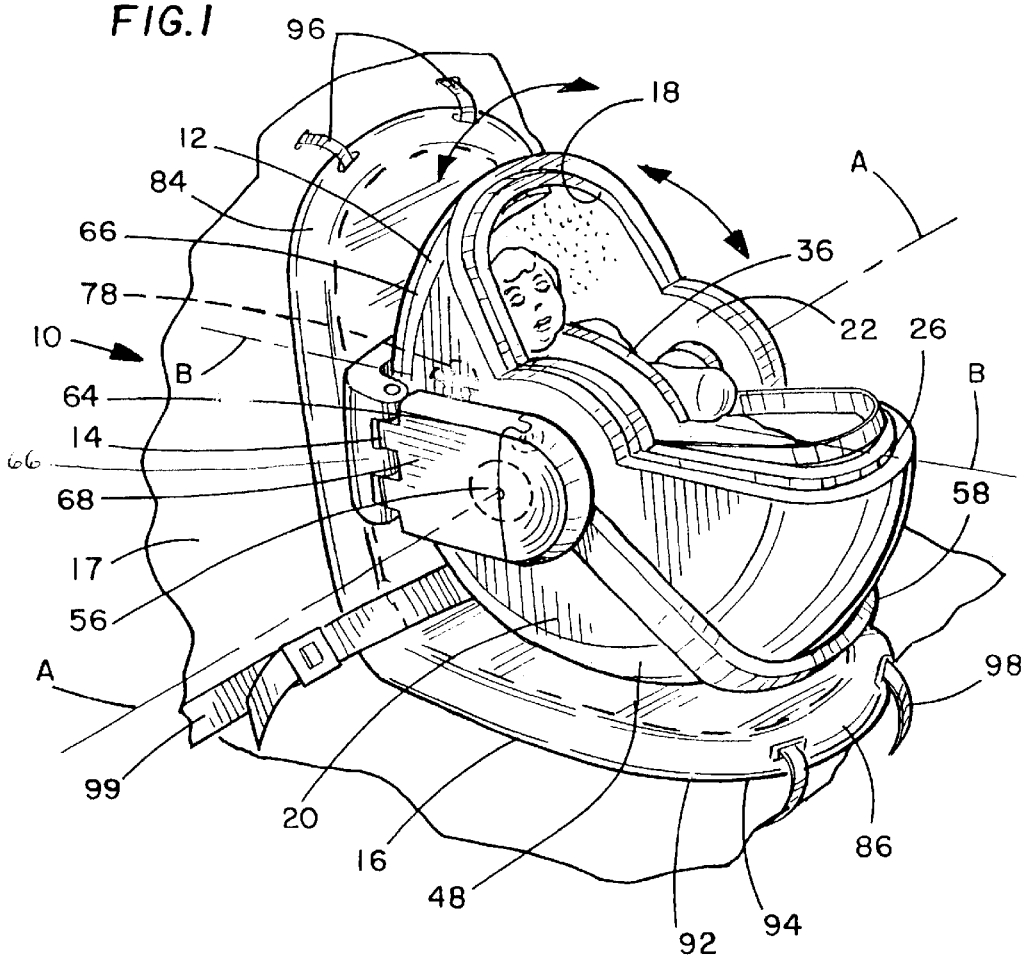
FIG. 1 is a perspective view of the kinetic child restraint device of the present invention.

For the purpose of promoting an understanding of the principles of the invention, references will be made to the embodiments illustrated in the drawings. It will, nevertheless, be understood that no limitation of the scope of the invention is thereby intended, such alterations and further modifications in the illustrated device, and such further applications of the principles of the invention illustrated herein being contemplated as would normally occur to one skilled in the art to which the invention relates.

A preferred embodiment of the kinetic child restraint device 10 of the present invention is shown in FIG. 1 with an infant laying in a capsule 12. The kinetic infant restraint device 10 is adapted to rotate the infant to protect the head, neck and spine from injury during a collision.

Figure 2:
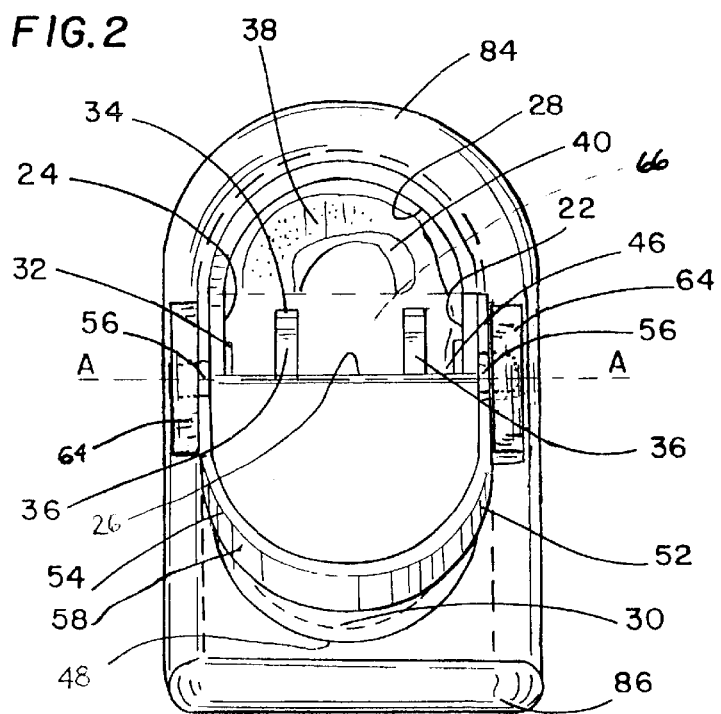
FIG. 2 is a front view of the kinetic child restraint device.

The infant restraint device 10 includes the capsule 12, a bracket 14, and a base member 16. The capsule 12, shown in FIGS. 1–3, is shaped to support an infant and can be made from a variety of materials such as plastic, fiberglass, or metal. The capsule 12 includes an inside surface 18 and an outside surface 20. The inside surface 18, shown in FIG. 2, includes a right side 22, a left side 24 a front side 26, a rear side 28 and a bottom side 30. The bottom side 30 of the capsule 12 may be weighted to aid in the proper rotation of the capsule 12 during an impact to ensure the infant's head, neck, back and shoulders are perpendicular to the impact force. An alternative to weighting the capsule 12 is to position the infant within the capsule 12 so that an off-balance weight distribution results in relation to the center of gravity. Another alternative is to attach the capsule 12 offset to a pivot 56 to allow for eccentric movement. The right and left side 22 and 24 can also include reinforcing plates 32 to strengthen the capsule 12 at the points of rotation. These plates 32 can be either bolted to the right and left side 22 and 24 or molded with the fabrication of the capsule 12. The bottom side 30 may also include reinforced anchor points 34 to allow for the attachment of an infant restraint harness 36. The inside surface includes energy absorbing foam 38, and an infant head restraint bolster 40 to aid in preventing unwanted movement of the infant and to absorb any extra force not dissipated by the capsule 12.

The inside surface 18 may also include a removable infant carrier 42, as shown in FIG. 3, that locks within the capsule 12 with the use of a locking mechanism 44. The removable infant carrier 42 may also include a foldable handle 46 so the carrier 42 can be transported from the vehicle to the home without the need to disturb the child if they are sleeping. The removable carrier 42 would be carried to the vehicle and locked into the capsule 12. If the carrier 42 is used, the foam 38 and head bolster 40 would be mounted within the carrier 42 instead of the capsule, as well as the harness 36 anchor points 34. The capsule 12 is designed so the infant is almost horizontal, with only a slight inclination to the head and neck. The capsule 12 can be designed so that the infants head is located near the rear side 28 of the capsule 12 so the infant is oriented in a forward facing position during travel. Since the capsule 12 will automatically pivot during an accident to orient the child to the optimum position, it is not necessary to place them facing the rear of the vehicle. Alternatively, if it is desirable to position the child in a rear facing direction, the capsule 12 can be arranged so that the infant's head is located near the front side 26 of the capsule 12. Whether the infant is fastened in a front or rearward position, the capsule 12 will pivot in reaction to an impact.

The outside surface 20 of the capsule 12 is preferably curvilinear in shape with an enclosed bottom section 48 an open top section 50, a right side 52 and a spaced apart left side 54. Other shapes may also be utilized to accomplish the intended result. The right and left sides 52 and 54 are adapted to allow for the attachment of the capsule 12 to the bracket 14 by means of pivots 56. The pivots 56 allow the capsule 12 to rotate 360 degrees about an axis which is horizontal as illustrated in FIG. 2. The capsule 12 rotates concentrically about this axis of rotation. The mass of the child within the capsule 12 is positioned below or outboard of the centerline of the pivots 56 allowing the capsule to rotate. The bottom section 48 of the capsule 12 is enclosed and is designed so that it does not come into contact with the base member 16. If the capsule 12 were to come into contact with the base member 16 during a collision, the capsule 12 would be halted abruptly and the force from the impact would be transferred to the infant. The top section 50 of the capsule 12 is open to allow for the ingress and egress of the infant. The capsule 12 may be made selectively detachable from the bracket 14 to allow for removal of the capsule 12 from the vehicle so the infant does not need to be disturbed. To aid in the removal of the capsule 12, a foldable handle 58, as shown in FIG. 1, maybe mounted to the outside surface 20. Several different release mechanisms can be utilized to release the capsule 12 from the bracket 14. The first is a detachable mount (not shown) that disconnects from the right and left side 52 and 54 of the capsule 12. The second mechanism is a releasable pivot 56 that can release the capsule 12 from the bracket 14. The third mechanism is a releasable mount 64 that releases the pivot 56 from the bracket 14. Once the capsule 12 is released from the bracket 14, it can removed from the vehicle and carried by the foldable handle 58. It also may be desirable to apply a braking mechanism (not shown) of any type known to one of ordinary skill in the art to the pivots 56 to provide a frictional force and thereby reduce the rotation of the capsule during normal driving conditions. The braking mechanism may also be used to attenuate the rotation of the capsule during a collision.

The bracket 14 is a U-shaped member. As previously described, the capsule 12 is pivotally attached to the bracket 14 for rotation about a first axis A, as best shown in FIG. 1. In turn the bracket 14 is pivotally connected to the base member 16 for rotation about a second axis B, best shown in FIG. 3. The axis A lies in a first plane. The axis B lies in a second plane which intersects with the first plane, preferably in a perpendicular relationship. The bracket 14 can be constructed out of a variety of materials such as plastic, graphite, fiberglass or metal. The bracket 14, shown in FIG. 2, includes a base member 66, and arms 68. The arms 68 each include a first end 72 and a second end 74, as shown in FIG. 3. The first end 72 is connected to the base member 66 and may include a locking hinge 76 to allow the arms 68 to be folded if so desired. It may also be desirable to fold the arms 68 if the restraint device 10 is integrated into the seat 17 of the vehicle. When the infant restraint device 10 is not in use, the arms 68 may be folded and covered with a seat cushion. The second end 74 includes the pivot 56 that attaches to the capsule 12 to create a first axis of rotation. The pivot 56 needs to be positioned so that the capsule 12 can rotate 360 degrees without coming into contact with the base member 66. The second end 74 may also include a releasable mount 64 to allow the pivot 56 to be removed from the arms 68.

The base member 66, shown in FIG. 3, of the bracket 14 includes a pivot 78. The pivot 78 allows the bracket 14 to be pivotally attached to the base member 16 to create a second axis of rotation B. The pivot 78 can be designed so that it includes a disconnect mechanism (not shown) so that the bracket 14 and capsule 12 can be released from the base member 66. Alternatively, the base member 66 may also include a release mechanism 80 to allow the bracket to be removed from the base member 16 so the bracket 14 and capsule 12 can be removed from the vehicle in one piece. The base member 66 of the bracket 14 can be either pivotally mounted to a vertical leg 84 of the base member 16 or pivotally mounted to a horizontal leg 86 of the base member 16. Either position can be used so long as the bracket 14 can rotate 360 degrees around the axis B without encountering any obstructions. The axes of rotation A & B created by pivots 56 and pivot 78 respectively do not need to be perpendicular to one another. To reinforce the arms 68 and 70, ribbing or a honeycomb structure 90 may be used to prevent any flexing in the arms.

The base member 16 is illustrated as being generally L-shaped and is used to secure the bracket 14 and the capsule 12 to the vehicle seat. The vertical leg 84 and the horizontal leg 86 can be adapted to allow the attachment of the pivot 78 to permit the connection of the bracket 14, as shown best in FIGS. 1 & 3. The base member 16 can be fabricated from plastic, fiberglass, carbon fiber, or metal. If the bracket 14 is attached to the vertical leg 84, the pivot 78 is positioned so that the bracket 14 and capsule 12 can rotate 360 degrees circular without coming in contact with the horizontal leg 86. Alternatively, if the bracket 14 is attached to the horizontal leg 86, the pivot 78 is positioned so that the bracket 14 and the capsule 12 do not contact the vertical leg 84 during a full rotation. The base member 16 is also adapted to allow a vehicular seatbelt harness 99 to pass over the base member 16, as shown in FIG. 1, to restrain the child restraint device 10 to the vehicle. To aid in preventing movement of the base member 16 when it is fastened to a vehicle seat 17, friction material 92 may be added to a bottom side 94 to prevent excessive movement, shown in FIG. 1. To also aid in limiting the movement of the base member 16 during a collision, top tether straps 96 are attached to the vertical leg 84 and attached to an anchor point within the vehicle. Newer vehicles include child seat tether anchor points, which are typically located on the rear deck near the rear window of the vehicle. It may be desirable to include additional tether straps 98 to the horizontal leg 86 and attached to the seat portion of the vehicle seat 17.

The kinetic infant restraint device 10, during a collision, responds to an impact by repositioning the capsule 12 so that the bottom half 48 of the capsule 12 is perpendicular to the impact force. It is at this point in the collision where the infants head, neck and spine are perpendicular to the impact force and completely supported by the energy absorbing foam 38 and the head bolster 40 on the bottom side 30 of the capsule 12, as shown in FIG. 2. There is no force being applied to the restraint harness 36, which is used as a secondary restraint measure. The force of the impact will be transferred from the horizontal force to a rotational force causing the capsule 12 to rotate about the first and second axes until the energy is dissipated. The restraint harness 36, during the rotation, restrains the child in the capsule 12. The force exerted by the harness 36 is no more than the weight of the child since the impact force is transferred to rotational energy.

Another benefit to the kinetic restraint device 10 is that the forces of hard acceleration, braking, and cornering will be diminished on the capsule and its passenger since the seat will pivot forward, rearward or sideways in reaction to these forces. The ability of the restraint device to react to these forces will isolate the child and prevent unwanted movement. An alternative embodiment is disclosed in FIGS. 5 & 6. An L-shaped bracket 114 can include a base member 166 and a first arm 168 as shown in FIG. 5. In this alternative arrangement, only one arm 168 is used with a single pivot 156 to attach a capsule 112 to the bracket 114. The single arm 168 arrangement can also include a locking hinge 176 on the first end 172 to allow the arm 168 to be folded when not in use. The capsule 112 is pivotally attached to the bracket 114 for rotation about a first axis C, as best shown in FIG. 5. In turn the bracket 114 is pivotally connected to the base member 116 for rotation about a second axis D. The bracket can be pivotally connected to the vertical leg 184 or the horizontal leg 186 of the base member 116. The axis C lies in a first plane. The axis D lies in a second plane which intersects with the first plane preferably in a perpendicular relationship.

Another embodiment (not shown), instead of attaching the pivot 78 of the base member 66 to the infant restraint device 10 base member 16, the bracket 14 can be directly mounted to the vehicle seat 17 if it is desirable to use an integrated child safety seat design. Several vehicle manufacturers are now providing integrated child safety seats as standard equipment. This design would require a vehicle seat 17 to be designed to allow the bracket 14 to rotate 360 degrees around the pivot 78 without coming into contact with any part of the seat. When the infant restraint device 10 is not in use, the bracket 14 can be folded into the back cushion of the vehicle seat. In the alternative, if the bracket 14 is pivotally connected to the seat portion of the vehicle seat, the bracket 14 can be folded downward into the seat portion.

As a child matures from the infancy stage to the toddler stage, about 1 year old, the capsule 12 can be replaced with a seat 100 that is placed in the upright position, as shown in FIG. 7. The seat 100 includes a back member 106, a seat member 108 and a pivot 102 located on the bottom surface 104 of the seat 100 with an offset center axis positioned so that the seat will swivel in reaction to a collision. To provide enhanced protection for a toddler, it is desirable to have the toddler seat encounter the impact force in a backwards orientation so the child's head, neck and back are supported by the back member 106 of the seat 100. The seat 100 includes energy absorbing foam 110 and a restraint harness 136 to reduce the movement of the toddler and aid in absorbing the force of the impact. Since the seat 100 is pivotally mounted directly to the base member 16 with the pivot 102, it is unnecessary to use the bracket 14. The pivot 102 must be mounted on the horizontal leg 86 of the base member 16 so the seat 100 can swivel 360 degrees about an axis without coming into contact with the vertical leg 84 of the base member 16 or any other part of the vehicle. The toddler seat 100 can also be integrated into the vehicle by mounting the pivot 102 directly to the vehicle seat. The pivot 102 is mounted offset of the center of rotation of the seat 100 so that the back member 106 automatically shifts to a perpendicular position in relation to the impact force. While the toddler seat 100 has only one axis of rotation, it is superior to seats currently in the marketplace. Present restraint seats for toddlers place them in a forward facing position and rely on straps to restrain the child during a collision. The toddler seat 100, shown in FIG. 7, upon impact, will rotate the child so that the back member 106 is perpendicular to the impact force. The restraint harness 136 is used to maintain the child's position in the seat 100. Since the back of the child is facing the impact force, the force applied to the child by the harness 136 during a collision is minimal. Prior art seats for toddlers rely on the straps to restrain the child during a collision, which restrain a child propelled forward at impact speed. This force can be up to 40–50 times the weight of the child. For a 30 pound toddler, the impact force caused by the collision could be 1000 lbs.

applied against the toddlers body by the harness 136, applied within a fraction of a second. The toddler seat 100 transfers the impact force into a kinetic rotational energy that is dissipated as the seat 100 rotates.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A child support device adapted for vehicular travel including:

a capsule adapted to contain and support a child for travel;

a bracket pivotally secured to said capsule on at least one side thereof so as to provide pivotal movement of said capsule with respect to said bracket about a first axis lying in a first plane;

a pivotal mounting connection adapted to pivotally connect said bracket to a vehicle support for rotation about a second axis, said second axis lying in a second plane which intersects said first plane;

whereby said capsule is simultaneously pivotable about said first and second axes.

2. The child support device as in claim 1, in which said first plane is perpendicular to said second plane.

3. The child support device as in claim 1, including a substantially vertically oriented back member connected to said bracket through said pivotal mounting connection.

4. The child support device as in claim 3, including a substantially horizontally oriented platform member associated with said back member and disposed beneath said capsule, said back member and said platform member adapted to be secured to a vehicle seat.

5. The child support device as in claim 1, including a securement mechanism associated with said capsule to restrain the child within said capsule.

6. The child support device as in claim 1, including a release mechanism associated with said capsule to allow the removal of said capsule from said bracket thereby rendering said capsule portable.

7. The child support device as in claim 1, including a removable cushion insert associated with said capsule, adapted to support a child.

8. The support device as in claim 1, wherein said bracket is pivotally connected to a vehicle seat.

9. A child support device adapted for vehicular travel including:

a capsule adapted to contain and support a child for travel;

a bracket adapted to pivotally support said capsule;

a first pivot connecting said bracket to said capsule at a point offset from the center of gravity of said capsule to create a first offset axis of rotation lying in a first plane;

a second pivot connecting said bracket to a support member at a point offset from the center of gravity of said capsule to create a second offset axis of rotation lying in a second plane, said support member adapted to be secured to a vehicle;

whereby said capsule is simultaneously pivotal about said first and second axes.

* * * * *